United States Patent
Tillotson

(10) Patent No.: US 11,082,635 B2
(45) Date of Patent: Aug. 3, 2021

(54) SYSTEMS AND METHODS FOR VIDEO DISPLAY

(71) Applicant: The Boeing Company, Chicago, IL (US)

(72) Inventor: Brian Tillotson, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 16/402,076

(22) Filed: May 2, 2019

(65) Prior Publication Data

US 2020/0351451 A1 Nov. 5, 2020

(51) Int. Cl.
| | |
|---|---|
| *H04N 17/02* | (2006.01) |
| *H04N 17/04* | (2006.01) |
| *H04N 5/262* | (2006.01) |
| *B64D 11/00* | (2006.01) |
| *H04N 17/00* | (2006.01) |

(52) U.S. Cl.
CPC .......... *H04N 5/2628* (2013.01); *B64D 11/00* (2013.01); *H04N 17/002* (2013.01); *H04N 17/04* (2013.01); *B64D 2011/0061* (2013.01)

(58) Field of Classification Search
USPC ........................................................ 348/144
See application file for complete search history.

(56) References Cited

U.S. PATENT DOCUMENTS

| | | | |
|---|---|---|---|
| 6,866,225 B2 | 3/2005 | Jones et al. | |
| 9,669,940 B1 | 6/2017 | Tiana et al. | |
| 9,865,175 B2 * | 1/2018 | Johnsson | .................. G06G 7/48 |
| 2004/0102676 A1 | 5/2004 | Brendley et al. | |
| 2004/0217234 A1 * | 11/2004 | Jones | ................. B64D 11/0015 244/118.5 |
| 2005/0007386 A1 | 1/2005 | Berson et al. | |
| 2012/0140070 A1 * | 6/2012 | De Mers | .............. G02B 27/017 348/144 |
| 2015/0332503 A1 | 11/2015 | Le Meur et al. | |

OTHER PUBLICATIONS

"Extended European Search Report Received for PCT Application No. 20153009.4-1210", dated Mar. 23, 2020, 9 pages.
Akatsuka et al., Compensation for end to end delays in a VR system, 1998, 4 pages, IEEE.

* cited by examiner

*Primary Examiner* — Mikhail Itskovich

(57) ABSTRACT

Implementations provide an aircraft synthetic vision system ("SVS") giving passengers an exterior view. Omitting windows reduces costs, lowers weight, and simplifies hypersonic aircraft design and construction. Unlike contemporary SVSs, no lag exists between the exterior view and actual aircraft motion. Passengers experience no airsickness associated with a visual and vestibular system feedback mismatch. Lag is eliminated by predicting aircraft interior motion based on sensor feedback, and (b) displaying video camera images transformed to match the predicted aircraft orientation when the images get through the display system latency. Implementations predict aircraft orientation and pre-transform—through the use of dead reckoning to adjust a video signal based on sensed aircraft dynamics and an aircraft electronic model—an image captured from a video camera to match that orientation at the image display time. This approach is robust, cheaper, and more effective than conventional SVS at providing an airsickness-free view of the aircraft exterior.

31 Claims, 11 Drawing Sheets

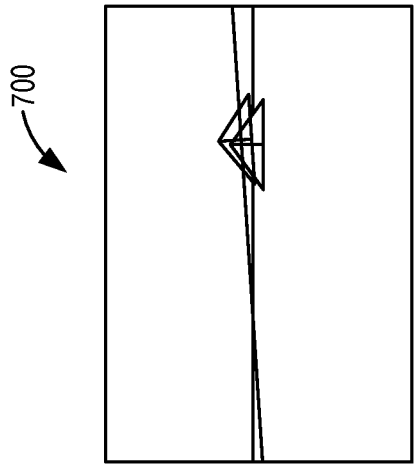
FIG. 5
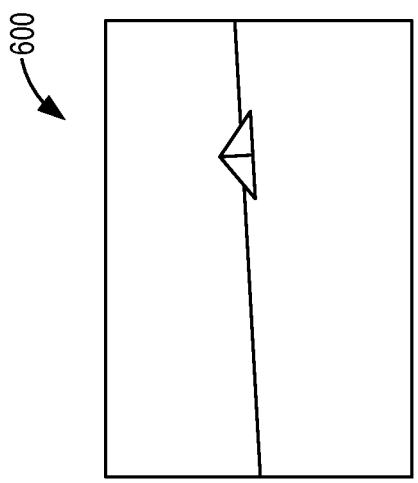
FIG. 6
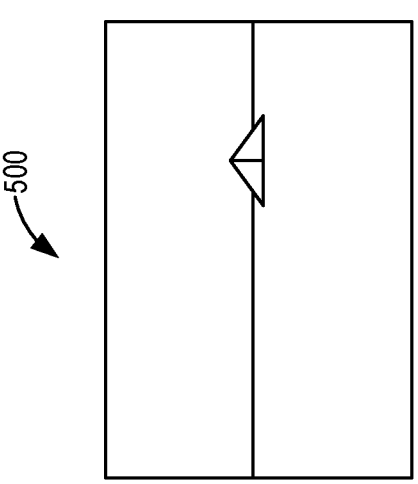
FIG. 7
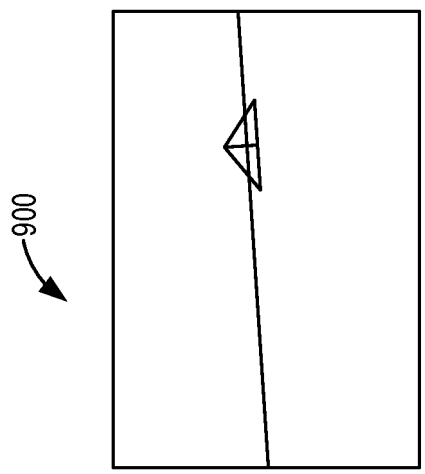
FIG. 8
FIG. 9

SYSTEMS AND METHODS FOR VIDEO DISPLAY

BACKGROUND

Passengers in moving vehicle—including ground transportation, sea vessels, submersibles, and aircraft—often suffer various forms of motion sickness. In aircraft particularly, providing passengers with an exterior view demonstrably reduces claustrophobia and airsickness. Adding conventional windows increases aircraft manufacture and maintenance costs, and also increases aircraft weight. Windows made with conventional transparent materials are also potentially thermally infeasible for a wide array of hypersonic aircraft now in development at least because of temperature limits on such materials.

Conventional contemporary electronic video displays (sometimes called "synthetic vision systems" or "SVS") used in place of windows in aircraft avoid the shortcomings of windows, but also directly cause and amplify the severity of airsickness because the displayed exterior view lags behind actual motion of the aircraft, even when state-of-the-art low-latency cameras and display systems are used. The presence of any lag or latency—even low lag or low latency—is enough to create a mismatch between passenger vision and vestibular system feedback, resulting in airsickness.

SUMMARY

Some implementations provide a display system. The display system includes an inertial measuring system (IMS) configured to sense dynamics of an aircraft; a video camera configured to image an external scene; a video display system inside the aircraft; and an image processing sub-system. The image processing sub-system comprises a video processor. The image processing sub-system is configured to access an electronic model of the aircraft and compare the dynamics sensed by the IMS to the electronic model to generate a predicted movement of the aircraft, estimate a lag between a scene and the external scene imaged by the video camera based on the predicted movement, and generate video signals that are pre-compensated for the lag to drive the video processor to display on the video display system a lag compensated video image of the external scene.

Other implementations provide a method for video display. The method includes sensing dynamics of an aircraft using an inertial measuring system (IMS); imaging an external scene using a video camera; displaying the external scene imaged by the video camera using a video display system inside the aircraft; and configuring an image processing sub-system comprising a video processor to access an electronic model of the aircraft and compare the dynamics sensed by the IMS to the electronic model. The comparison generates a predicted movement of the aircraft; estimates a lag between a scene and the external scene imaged by the video camera based on the predicted movement; and generates video signals that are pre-compensated for the lag to drive the video processor to display on the video display system a lag compensated video image of the external scene.

Still other implementations provide one or more non-transitory computer readable media having computer-executable instructions stored thereon for video display, which, on execution by a computer, cause the computer to perform operations. The operations include sensing dynamics of an aircraft; imaging an external scene using a video camera; displaying the external scene imaged by the video camera using a video display system inside the aircraft; configuring an image processing sub-system comprising a video processor to access an electronic model of the aircraft and compare the dynamics sensed by the IMS to the electronic model. The comparison generates a predicted movement of the aircraft; estimates a lag between a scene and the external scene imaged by the video camera based on the predicted movement; and generates video signals that are pre-compensated for the lag to drive the video processor to display on the video display system a lag compensated video image of the external scene.

This Summary is provided to introduce a selection of concepts in a simplified form that are further described below in the Detailed Description. The foregoing Summary, as well as the following Detailed Description of certain implementations, will be better understood when read in conjunction with the appended drawings. This Summary is not intended to identify key features or essential features of the claimed subject matter, nor is it intended to be used as an aid in determining the scope of the claimed subject matter.

BRIEF DESCRIPTION OF THE DRAWINGS

These and other features, aspects, and advantages of the present disclosure will become better understood when the following detailed description is read with reference to the accompanying drawings, wherein:

FIG. 5 is an illustration of an external scene at the time of imaging by a video camera in accordance with an implementation.

FIG. 6 is an illustration of the external scene at the time the image is displayed on a synthetic vision system (SVS) to passenger(s) in accordance with an implementation.

FIG. 7 is an illustration of the mismatch between the external scene at the time of imaging by a video camera and the external scene at the time the image is displayed on the SVS to passenger(s) in accordance with an implementation.

FIG. 8 is an illustration of the transformation of the imaged external scene in accordance with an implementation.

FIG. 9 is an illustration of the transformed imaged external scene, such that the transformed external scene matches the actual external scene in accordance with an implementation.

Corresponding reference characters indicate corresponding parts throughout the drawings in accordance with an implementation.

DETAILED DESCRIPTION

Figure 1:
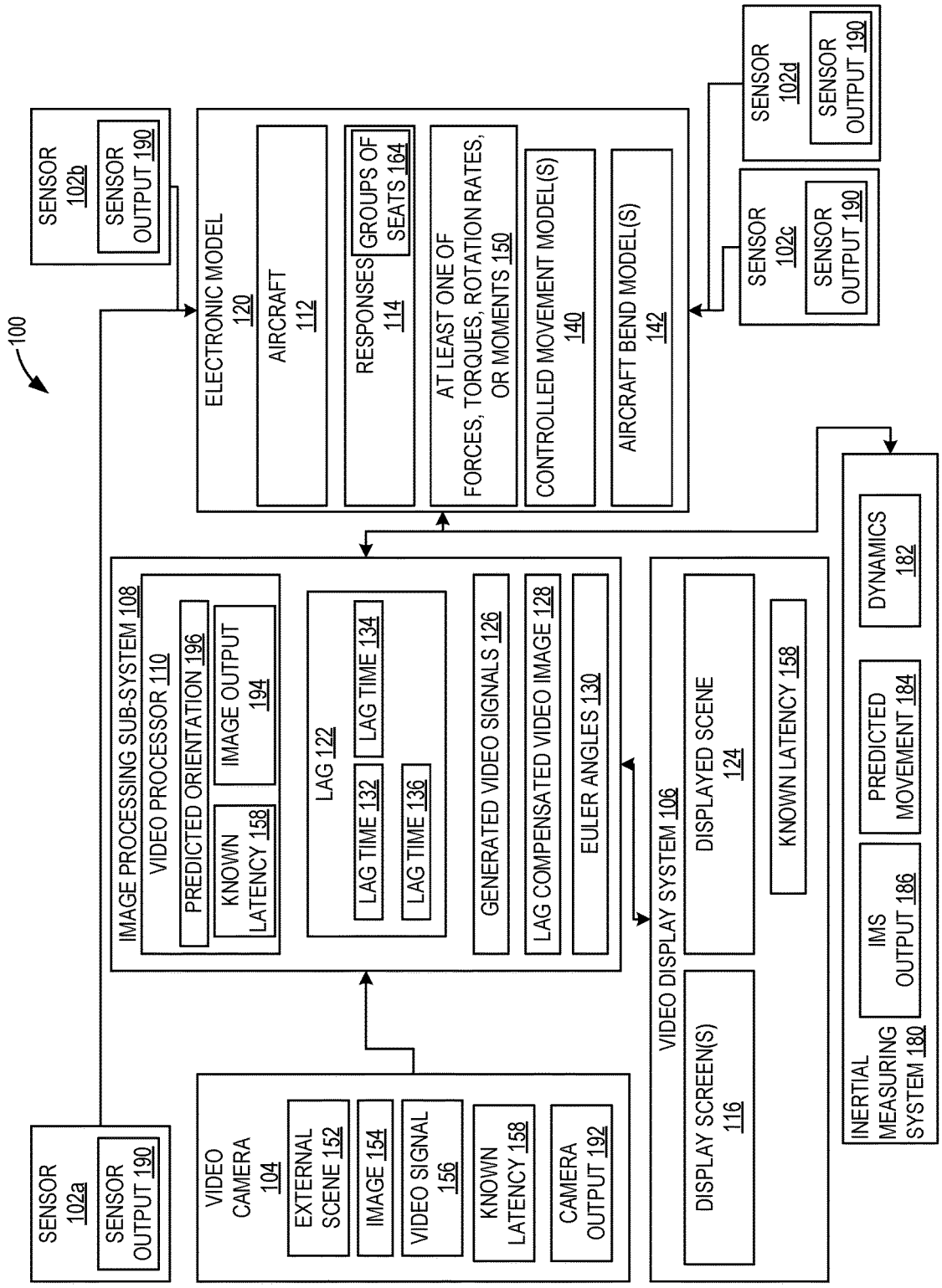
FIG. 1 is a block diagram illustrating an implementation of a display system in accordance with an implementation.

Referring to the figures, implementations of the disclosure include systems and methods for video display that provide passengers in moving vehicles, particularly aircraft, with an exterior view to reduce claustrophobia and airsickness. Utilizing such a video display obviates the need for conventional windows. Omission of such conventional windows in aircraft construction can reduce aircraft manufacture and maintenance costs, as well as decrease aircraft weight and render unnecessary structural penetration of the fuselage for purposes of providing an exterior view. Less structural penetration strengthens and extends the useful lifetime of the structure. Further, not using such conventional windows simplifies the design and construction of hypersonic aircraft by removing or substantially reducing the need for potentially thermally infeasible conventional windows constructed from temperature-limited materials.

Systems and methods for electronic video display (a synthetic vision system or "SVS") are disclosed featuring no lag (or reduced lag) between the displayed exterior view and the actual motion of the aircraft, such that passengers do not experience discomfort attributable to lag or latency creating a mismatch between passenger vision and vestibular system feedback. Thus, the visual-vestibular mismatch vector for airsickness is eliminated.

The elements described herein in various implementations operate in an unconventional manner to provide lag-free video display by (a) predicting motion of the aircraft interior based on sensor feedback representing aircraft dynamics (e.g., positions of control surfaces and accelerometer measurements), and (b) displaying video camera images that are rotated or translated to match the aircraft's predicted orientation to compensate for the latency of the display system. The disclosure is thus superior to typical implementations of synthetic vision systems that provide either no or insufficient elimination of lag, and thus no protection against (or unsatisfactory protection against) airsickness caused by a mismatch between passenger vision and vestibular system feedback. The performance of implementations of the video display disclosed herein, as measured by the ability to provide an apparently lag-free and apparently live video stream of the environment outside a moving vehicle, substantially equals and sometimes exceeds conventional existing contemporary video displays/synthetic vision systems having designs that introduce inherent and unavoidable lag.

Further, unlike other conventional synthetic vision systems, the disclosure does not attempt to reduce latency in any camera or display system. Such reduction is technologically complex and (often prohibitively) expensive. Instead, the disclosed display systems and methods predict vehicle (in particular, aircraft) orientation and pre-transform an image captured from a video camera to match that orientation at the time the image is displayed to passengers. This transformation is achieved through the use of dead reckoning to generate a predicted movement of the vehicle. Some implementations use dead reckoning to adjust a video signal based on Euler angles and an electronic model of the aircraft.

The disclosure is thus mechanically more robust and more cost effective to implement, while at the same time being more effective than conventional synthetic vision systems at providing an apparently live view of the environment outside the vehicle while avoiding causing motion sickness and or airsickness.

Referring again to FIG. 1, a block diagram illustrates an implementation of a display system 100 in accordance with an implementation. The display system 100 comprises an inertial measuring system (IMS) 180 configured to sense dynamics 182 of an aircraft 112. In some implementations, the IMS 180 comprises an at least one sensor 102, and in other implementations the dynamics 182 comprise at least one of forces, torques, rotation rates, or moments 150. In some implementations including the sensors 102, the illustrated as a sensor 102a, a sensor 102b, a sensor 102c, and a sensor 102d. The display system 100 further comprises a video camera 104 configured to image an external scene 152 and a video display system 106 inside the aircraft (112). In some implementations, the video display system 106 is configured to display the external scene 152 imaged by the video camera 104. The display system 100 further comprises an image processing sub-system 108 comprising a video processor 110. In some implementations, the video processor 110 includes a frame buffer to store and later process each video frame, ensuring display at a constant frame rate and avoiding overcompensation. In some implementations of the display system 100, the video camera 104 is externally-facing and has a known field of view, a known location, and a known latency. Likewise, in some implementations of the display system 100, the video display system 106 comprises a plurality of display screens 116 sized and shaped as aircraft windows.

The image processing sub-system 108 is configured to access an electronic model 120 of the aircraft 112 and compare the dynamics 182 sensed by the IMS 180 to the electronic model 120 to generate a predicted movement 184 of the aircraft 112, estimate a lag 122 between a scene 124 and the external scene 152 imaged by the video camera 104 based on the predicted movement 184, and generate video signals 126 that are pre-compensated for the lag 122 to drive the video processor 110 to display on the video display system 106 a lag compensated video image 128 of the external scene 152. The scene 124 may represent an image to be displayed if there were no lag 122.

In some implementations, the lag 122 of the display system 100 is a known constant. In such implementations, the one or more stored lag 122 is determined before use of the display system 100, including but not limited to during: the initial engineering or design of the display system 100; measurement or testing of pre-production prototypes of the display system 100; or measurement or testing of the display system 100 either before or after installation of the display system 100 into the aircraft 112. The one or more stored lag 122 is stored as described elsewhere herein.

In some implementations, the electronic model 120 (e.g., motion model computes the response of the interior of the aircraft 112 to measured and or predicted dynamics 182 as a function of time. In some implementations of the display system 100, the lag 122 relates to (i) a lag time 132 between when an image 154 corresponding to the external scene 152 is sensed at the video camera 104 and a video signal 156 is output from the video camera 104, (ii) a processor lag time 134 of the video processor 110, and (iii) a lag time 136 between the output of the video signals 126 that are pre-compensated for the lag 122 and the display of the external scene 152 corresponding to the video signals 126 on the video display system 106. In some such implementations, at least one of the video camera 104, the video display system 106, and the video processor 110 have a known latency 158, such that any detected variation from the known latency 158 of at least one of the video camera 104, the video display system 106, or the video processor 110 indicate at least one of a malfunction of or interference with at least one of the video camera 104, the video display system 106, or the video processor 110.

In some other implementations of the display system 100, the electronic model 120 of the aircraft 112 comprises (i) one or more models that predict how the aircraft moves in response to control inputs 140 (e.g., engine thrust, etc.), and (ii) one or more models that define an amount of bend of the aircraft when one or more forces, torques, rotation rates, or moments are applied to the aircraft 142. Various other implementation include rigid and/or dynamic models as described in more detail herein.

The image processing sub-system 108 is further configured to generate video signals 126 that are pre-compensated for the lag 122 to drive the video processor 110 to display on the video display system 106 a lag compensated video image 128 of the external scene 152. In some implementations of the display system 100, the image processing sub-system 108 is further configured to perform dead reckoning to generate the predicted movement of the aircraft. In some implementations, dead reckoning is performed based on based on Euler angles 130 and the electronic model 120 of the aircraft 112.

In some implementations of the display system 100, the video processor 110 receives an output from the inertial measuring system (IMS output) 186 from the IMS 180 and a camera output 192 from the video camera 104, and uses the IMS output 186 and the electronic model 120 to transform the camera output 192 to compensate for the lag 122. In such implementations, the transforming comprises at least one of translating or rotating the external scene 152 imaged by the video camera 104. The translating and rotating aligns an image output 194 corresponding to the external scene 152 imaged by the video camera 104 imaged at a first time with a predicted orientation 196 of the aircraft 112 at a second time when the external scene 152 is to be displayed on the video display system 106. In some implementations, the IMS output 186 comprises an at least one sensor output 190 of at least one of the sensors 102, including but not limited to the sensor 102a, the sensor 102b, the sensor 102c, and the sensor 102d. For example, the sensor 102a may be a system configured to measure a deflection of a control surface such as an elevator of an aircraft. In some implementations, the sensor(s) 102 may be a physical sensor attached to the control surface. In other implementations, the sensor(s) 102 output may be a calculated or estimated value (e.g., a commanded or measured position of the control surface). The motion model may use the sensor output to predict the motion of the aircraft 112.

Some implementations of the display system 100 further comprise a plurality of video processors 160 (e.g., the video processor 110) and a plurality of video display systems 162 (e.g., the video display system 106). In such implementations, the electronic model 120 comprises responses 114 of groups of seats 164 to the dynamics 182 of the aircraft 112, and wherein each group of seats 164 is associated with an at least one video processor 166 (e.g., the video processor 110) and an at least one video display system 168 (e.g., the video display system 106). The at least one video processor 166 and the at least one video display system 168 associated with each group of seats 164 in communication with each other.

Various implementations use one or more motion models as described in more detail below. For example, one or more implementations of the present disclosure use one or more of a kinematics model, a dynamics model, and a structural model, among others.

Figure 2:
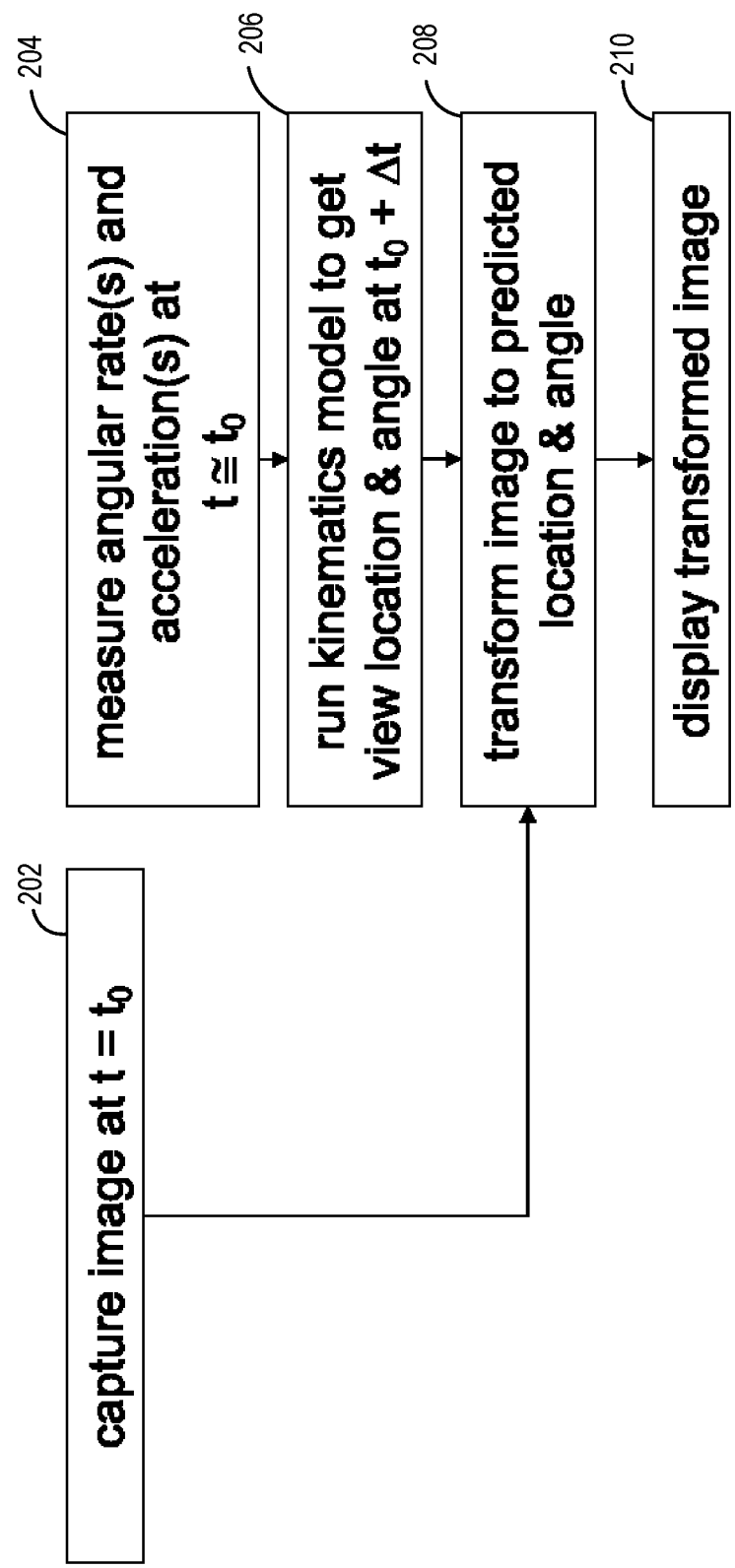
FIG. 2 is a flow diagram illustrating an implementation of the display system using a rigid body model as the electronic model in accordance with an implementation.

FIG. 2 is a flow diagram illustrating an implementation of the display system using a rigid body model 200 as the electronic model in accordance with an implementation. In some implementations, the electronic model is the electronic model 120 of FIG. 1. Implementations of the display system using the rigid body model 200 are suitable in applications where a rigid body vehicle (e.g., certain implementations of the aircraft 112 in FIG. 1) upon which a display system (e.g., the display system 100 of FIG. 1) is installed remain rigid while in motion. The rigid-body model 200 defines how the display system functions in a moving rigid body vehicle given a known initial motion and known applied dynamics (e.g., the dynamics 182 of FIG. 1). An IMS (e.g., the IMS 180 of FIG. 1) measure rates of change in the vehicle orientation along up to six axes (x, y, z, pitch, roll, and yaw). The number of axes depends on what is appropriate for the particular application.

Calculations performed by the rigid body model 200 begin with the capture of an image at time $t_0$, at operation 202. Angular rate(s) and acceleration(s) are measured at time t, when t≅$t_0$, at operation 204. A kinematics model (e.g., a six degrees of freedom (6DoF) model provides the predicted lag-free image view location and angle at time $t_0$+Δt at operation 206. Such kinematics models predict how a rigid body moves over time when the motions of other points over time are known. In some implementations, Δt is the sum of (i) a lag time between when an image corresponding to the external scene is sensed at the video camera and a video signal is output from the video camera, (ii) a processor lag time of the video processor, and (iii) a lag time between the output of the video signals that are pre-compensated for the lag and the display of the external scene corresponding to the video signals on the video display system. The image is transformed to the predicted location and angle at operation 208. The transformed image is displayed at operation 210. Thereafter, the work of the rigid body model 200 is complete.

In a hypothetical having a rigid aircraft with a constant rate of rotation (e.g., an aircraft pitching up at a constant two degrees per second), where the display system has a total system lag of 0.5 seconds, the aircraft rotates by one degree in pitch by time the imaged exterior shot (e.g., the external scene 152 of FIG. 1) arrives from the video camera (e.g., the video camera 104 of FIG. 1) to the video display system (e.g., the video display system 106 of FIG. 1). To compensate, the display system introduces a one-degree rotation correction in the displayed image (e.g., the scene 124 of FIG. 1).

In another hypothetical having a rigid aircraft with changing rates of rotation across and throughout the aircraft (that is, subject to angular acceleration), kinematics are utilized to introduce the appropriate correction by multiplying acceleration by lag time. Such calculations use at least the rates of rotation and acceleration measurements from the IMS, but in some implementations also utilize third and fourth derivatives of this data for refinements. In some implementations where the aircraft is travelling at great speed and close to either the ground, clouds, or other mid-air obstructions, linear translations are used to perform corrections. In other words, the display system detects, for instance, that the aircraft is flying past a cloud, and determines that when the last image was taken by the video camera the cloud was at the leading edge of the aircraft wing. By the time the image is displayed the cloud will need to be at the trailing edge of the wing, necessitating an appropriate corrective transformation.

Figure 3:
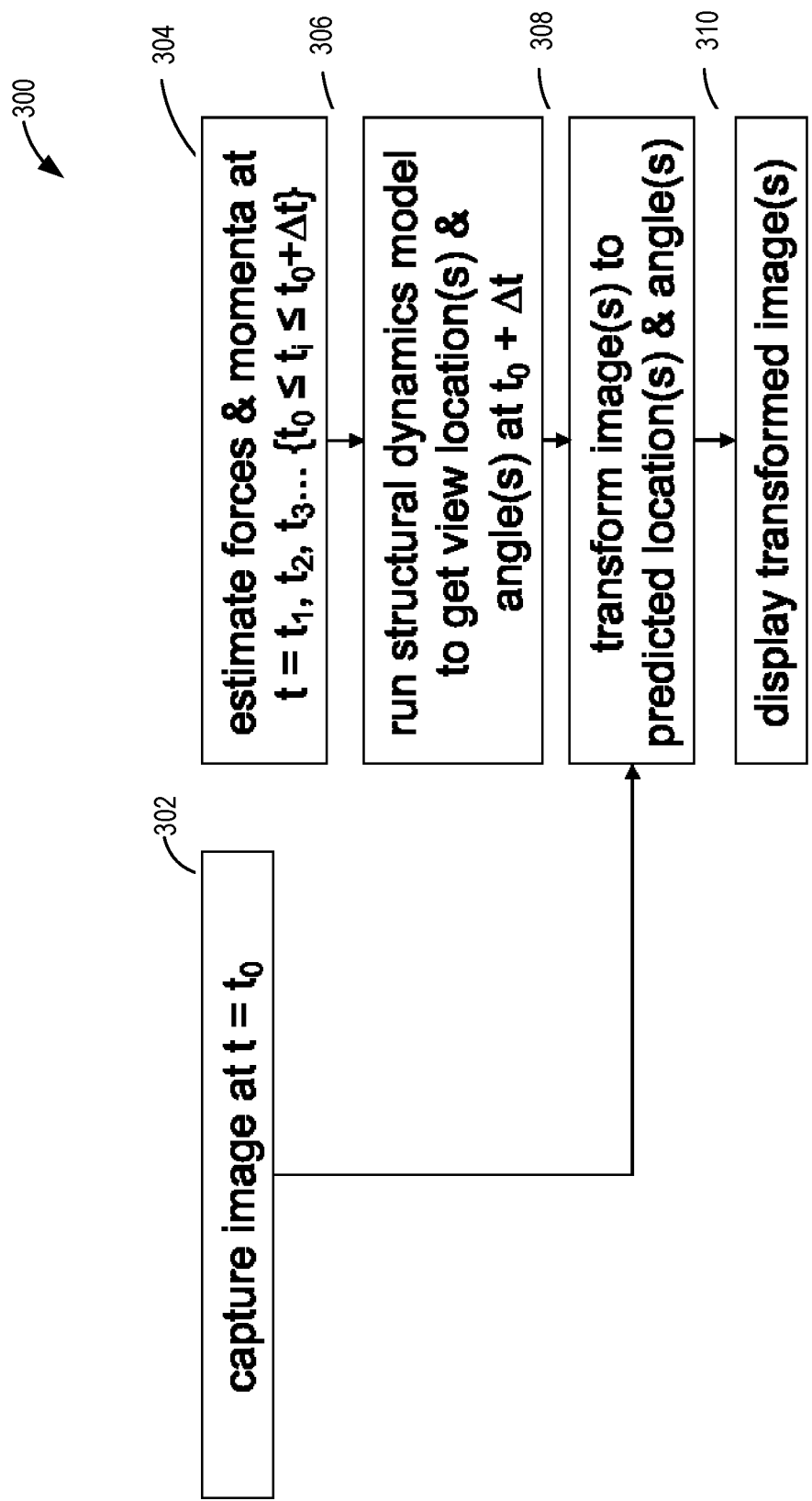
FIG. 3 is a flow diagram illustrating an implementation of the display system using a structural dynamics model as the electronic model and different display images in accordance with an implementation.

FIG. 3 is a flow diagram illustrating an implementation of the display system using a structural dynamics model 300 as the electronic model (e.g., the electronic model 120 of FIG. 1) and different display images in accordance with an implementation. Implementations of the display system using the structural dynamics model 300 are suitable in applications where vehicle is non-rigid (that is, structurally dynamic), such as certain implementations of the aircraft 112 in FIG. 1, upon which a display system (e.g., the display system 100 of FIG. 1) is installed. Structurally dynamic vehicles do not remain rigid while in motion. Rather, in a structurally dynamic vehicle, when a control surface moves a component while the vehicle is already in motion in a set direction at a set speed, the vehicle will change course and or speed as a result. The structural dynamics model 300 defines how the display system functions in a moving structurally dynamic vehicle where various points on the vehicle move over time, given a known initial motion and known applied dynamics (e.g., the dynamics 182 of FIG. 1) over time. The IMS (e.g., the IMS 180 of FIG. 1) measure rates of change in the vehicle orientation along up to six axes (x, y, z, pitch, roll, and yaw). The number of axes depend on what is appropriate for the particular application. The structural dynamics model 300 is of particular importance in any application where failure to compensate for different rates of rotation across a vehicle is likely to exacerbate motion sickness.

Calculations performed by the structural dynamics model 300 begin with the capture of an image at time $t_0$, at operation 302. The structural dynamics model 300 estimates forces and momenta at a range of times beginning at to and continuing through time $t_0+\Delta t$ at operation 304. In some implementations, $\Delta t$ is the sum of (i) a lag time between when an image corresponding to the external scene is sensed at the video camera and a video signal is output from the video camera, (ii) a processor lag time of the video processor, and (iii) a lag time between the output of the video signals that are pre-compensated for the lag and the display of the external scene corresponding to the video signals on the video display system. The structural dynamics model 300 provides the predicted lag-free image view location and angle at time $t_0+\Delta t$ at operation 306. The image is transformed to the predicted location and angle at operation 308. The transformed image is displayed at operation 310. Thereafter, the work of the structural dynamics model 300 is complete.

In some implementations of the structural dynamics model 300, forces are measured with strain gauges on the vehicle, and angular momenta and or angular rates are measured with rate gyros. Some other implementations measure accelerations of various parts of a structurally dynamic vehicle and use the structural dynamics model 300 to estimate the forces that produced those accelerations. Yet other implementations measure deflection of aerodynamic control surfaces (e.g., ailerons, elevators, etc.) and use the structural dynamics model 300 to estimate the forces that the control surfaces produce.

In other implementations of the structural dynamics model 300, deflections of aerodynamic control surfaces are predicted by interrogating a flight control system and using an aerodynamics model to estimate the forces that the control surfaces produce as a function of time. In some such implementations, the flight control system is a proportional integral derivative (PID) controller that moves each control surface toward a known target position at a known rate. PID controllers are instruments used in industrial control applications to regulate temperature, flow, pressure, speed and other process variables. Such implementations ably predict and model the effect of forces that occur even after image transformation is complete. Likewise, certain predictive implementations of the structural dynamics model 300 readily predict aerodynamic forces from external impactors such as updrafts or side gusts by measuring the accelerations or such impactors produce up to time to and using a gust model (e.g., a statistical model based on prior encounters with similar gusts) to predict the forces the impactors will produce over the next interval of $\Delta t$. Thus, prediction and modelling of the effect of forces that occur even after image transformation is achieved.

Some implementations of the structural dynamics model 300 combine any number, in whole or in part, of the foregoing calculations and predictions to complete image transformation.

Figure 4:
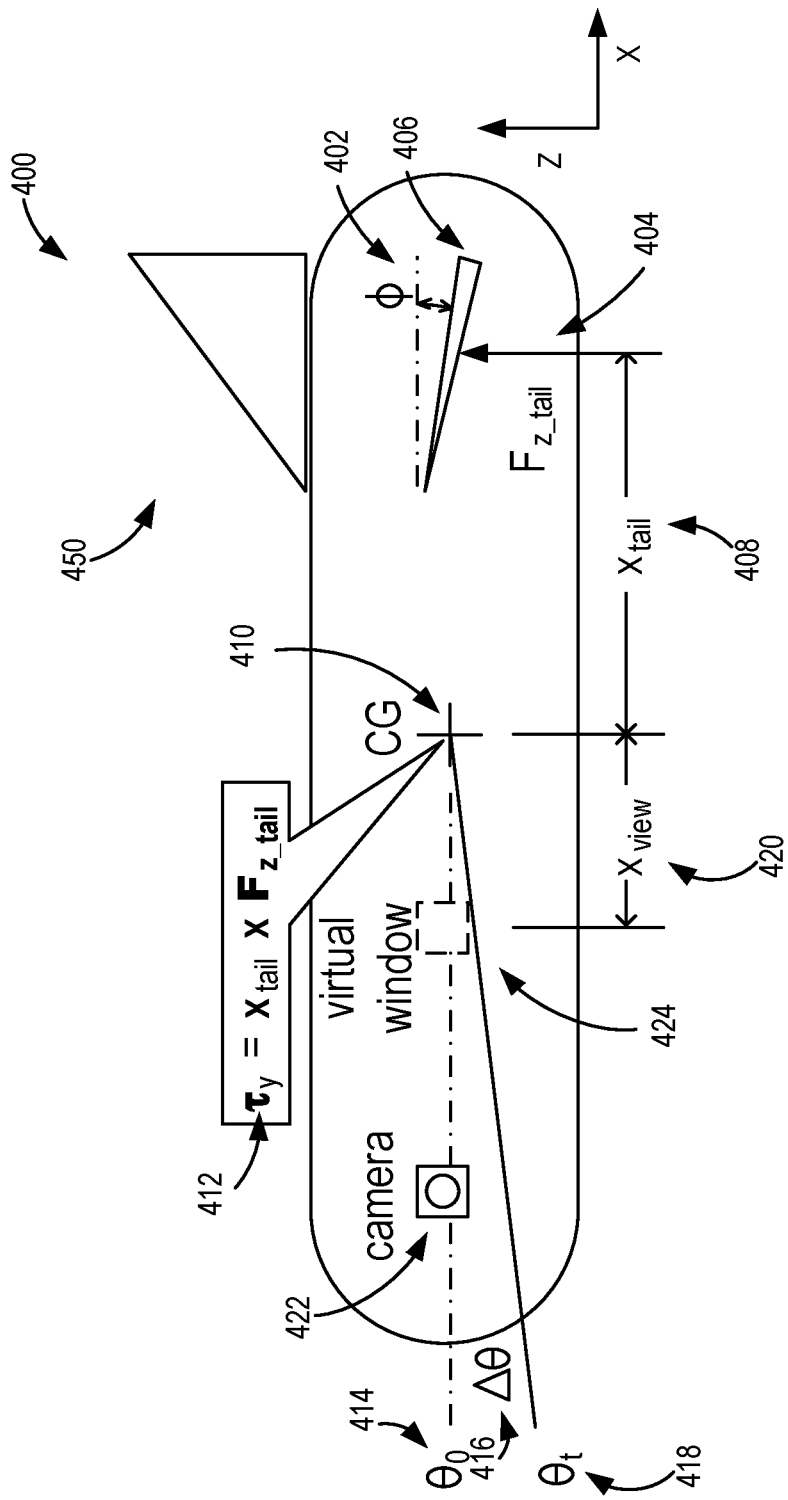
FIG. 4 is an illustration of force, movement, and rotation of an aircraft implementing the display system using an aerodynamics model as the electronic model.

FIG. 4 is an illustration of force, movement, and rotation of an aircraft implementing the display system using an aerodynamics model 400 as the electronic model. In some implementations, the electronic model is the electronic model 120 of FIG. 1. Implementations of the display system using the aerodynamics model 400 are suitable for any vehicle (e.g., an aircraft) required to be aerodynamically sound upon which a display system (e.g., the display system 100 of FIG. 1) is installed. The aerodynamics model 400 defines the dynamics (e.g., the dynamics 182 of FIG. 1) that are produced at various locations on an aircraft 450 (e.g., the aircraft 112 of FIG. 1) moving through air of known density at a known speed in a known orientation, including measured or estimated positions of control surfaces (e.g., ailerons, elevators, etc.).

In a hypothetical having the aircraft 450 implementing the display system using an aerodynamics model 400 as the electronic model, an elevator 406 deflects by a measured angle 402. Given a current airspeed, the deflection of elevator 406 generates an upward force, $F_{z\_tail}$ 404, on the elevator 406. Given a moment arm, $x_{tail}$ 408, from a center of gravity 410 (the "CG"), this force produces a torque, $t_y$ 412, defined by the equation $t_y=(F_{z\_tail})(X_{tail})$. The torque $t_y$ 412 pushes the nose of the aircraft 450 downward with an angular acceleration $\alpha$ (not shown). Angular acceleration $\alpha$ is defined as $$\alpha = \frac{t_y}{I_y}$$

where $t_y$ is $t_y$ 412 and $I_y$ (not shown) is the current moment of inertia of the aircraft 450 about the y-axis (not shown) through the CG 410. In some implementations, $I_y$ changes over time as the aircraft 450 consumes fuel or pumps fuel from one fuel tank not shown to another.

At the moment a camera 422 (e.g., the video camera 104 of FIG. 1) captures an image, the nose of the aircraft 450 is pointed at an angle $\theta_0$ 414 with an angular velocity $\omega_0$ (not shown). Given the angular acceleration $\alpha$, the aircraft 450 rotates through a change in angle defined by the formula $\Delta\Theta=\Theta_0+\omega_0\Delta t+\frac{1}{2}\alpha\Delta t^2$, where $\Delta\theta$ is $\Delta(\theta\ 414)$; and $\Delta t$ in some implementations has the meaning given in the discussion of FIGS. 2-3 herein, and in other implementations is the interval needed for the captured image to be transferred from the camera 422, transformed, and displayed on a virtual window 424 (e.g., the video display system 106 of FIG. 1). The display system rotates the image through the same angle $\Delta\theta$ such that the image is positioned at an angle $\theta_r$ 418 so as to match the angle of the aircraft 450 at the time of display to prevent airsickness as described elsewhere in this disclosure. In some implementations, the aerodynamics model 400 may take the effect of bending of the aircraft 450 caused by the torque, $t_y$ 412, on the airframe into account. As such, the aerodynamics model 400 may adjust the predicted motion based on the offset 420 from the center of gravity 410 based on the bending of the airframe.

FIGS. 5-7 collectively illustrate an external scene as perceived by a passenger travelling in a vehicle equipped with an SVS which fails to correct for the lag time introduced between the moment an image of the external scene outside the vehicle is captured and the moment such external scene is displayed to the passenger(s). FIG. 5 is an illustration of an external scene 500 at the time of imaging by a video camera in accordance with an implementation. FIG. 6 is an illustration of the external scene 600 at the time the image is displayed on an SVS to passenger(s) in accordance with an implementation. FIG. 7 is an illustration 700 of the mismatch between the external scene 500 at the time of imaging by a video camera and the external scene 600 at the time the image is displayed on the SVS to passenger(s) in accordance with an implementation, wherein the external scene 600 is presented as a wireframe overlay on the external scene 500. The mismatch between the external scene 500 and the external scene 600 depicted in the illustration 700 of FIG. 7 is known to cause airsickness in passengers using such SVS implementations. The display systems and methods disclosed herein (including but not limited to the display system 100, method 1000, method 1100, and method 1200) address the source of airsickness demonstrated by FIGS. 5-7.

FIGS. 8-9 collectively illustrate the operation of an SVS incorporating the display system and or methods disclosed herein (including but not limited to the display system 100, method 1000, method 1100, and method 1200) to prevent the mismatch between an external scene at the time of imaging by a video camera and an external scene at the time the image is displayed on the SVS to passenger(s) as depicted in FIG. 7. FIG. 8 is an illustration 800 of the transformation of an imaged external scene in accordance with an implementation. FIG. 9 is an illustration 900 of the transformed imaged external scene in accordance with an implementation, such that the transformed external scene matches the actual external scene.

Figure 10:
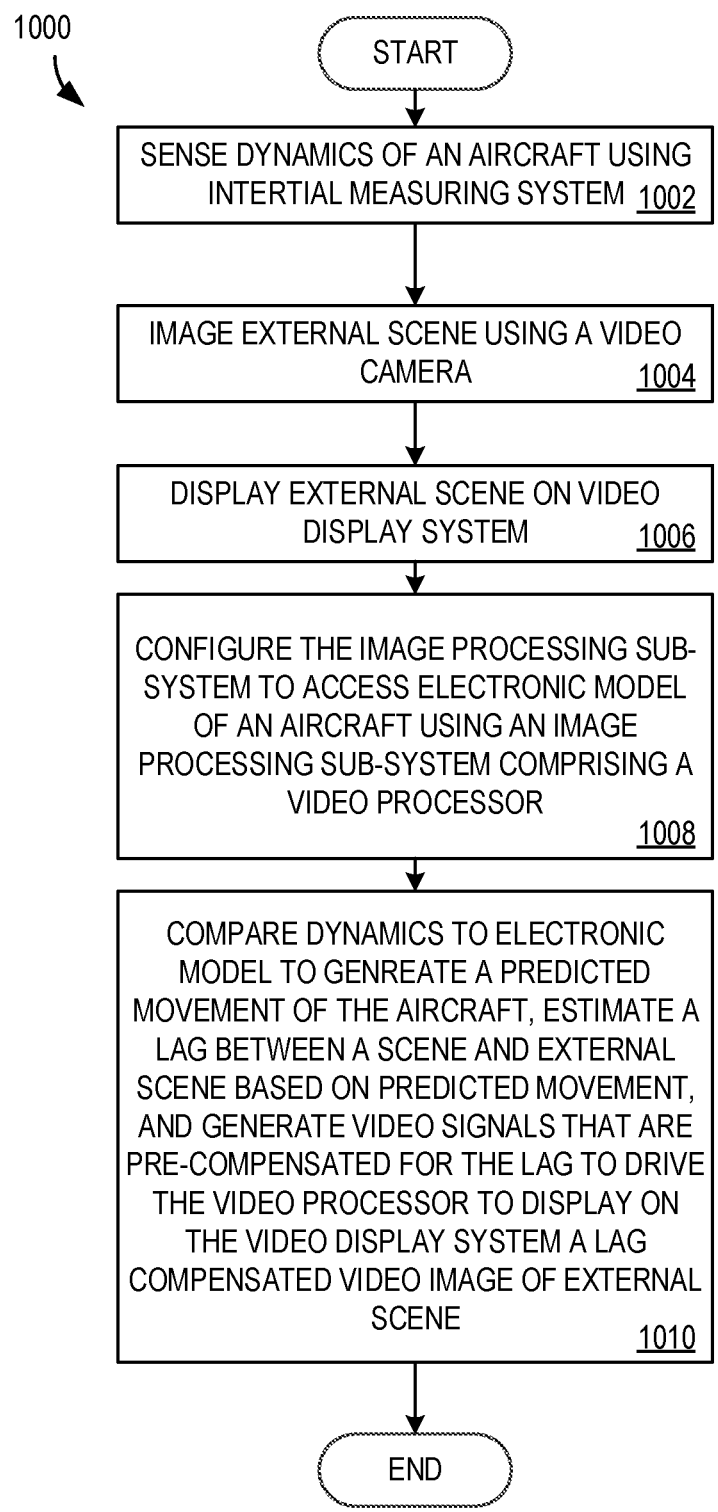
FIG. 10 is a flow chart illustrating a method for video display in accordance with an implementation.

FIG. 10 is a flow chart illustrating a method for video display 1000 in accordance with an implementation. In some implementations, the process shown in FIG. 10 is performed by a display system, such as the display system 100 in FIG. 1. The process senses dynamics of an aircraft using an inertial measuring system (IMS) at operation 1002; images an external scene using a video camera at operation 1004; displays the external scene imaged by the video camera using a video display system inside the aircraft at operation 1006; configures an image processing sub-system comprising a video processor to access an electronic model of the aircraft at 1008; and compares the dynamics sensed by the IMS to the electronic model to generate a predicted movement of the aircraft, estimate a lag between a scene and the external scene imaged by the video camera based on the predicted movement, and generate video signals that are pre-compensated for the lag to drive the video processor to display on the video display system a lag compensated video image of the external scene at operation 1010.

Some implementations of the method 1000 further comprise imaging the external scene (e.g., at operation 1004) using a plurality of video cameras and displaying the external scene imaged by the plurality of video cameras (e.g., at operation 1010) using a plurality of video display systems. In such implementations, the electronic model comprises responses of groups of seats within the aircraft to the dynamics of the aircraft, and each group of seats is associated with an at least one video processor and an at least one video display system. The at least one video processor and the at least one video display system are associated with each group of seats in communication with each other.

In some implementations of the method 1000 shown in FIG. 10, the lag relates to (i) a lag time between when an image corresponding to the external scene is sensed at the video camera and a video signal is output from the video camera, (ii) a processor lag time of the video processor, and (iii) a lag time between the output of the video signals that are pre-compensated for the lag and the display of the external scene corresponding to the video signals on the video display system. In some such implementations, at least one of the video camera, the video display system, and the video processor have a known latency, such that any detected variation from the known latency of at least one of the video camera, the video display system, or the video processor indicate at least one of a malfunction of or interference with at least one of the video camera, the video display system, or the video processor. For example, the lag may represent the difference in time between what an observer looking out of a window would see compared to what would be displayed on a screen. Thereafter, the process is complete. While the operations illustrated in FIG. 10 are performed by a display system, aspects of the disclosure contemplate performance of the operations by other entities. In some implementations, a cloud service performs one or more of the operations.

In some other implementations of the method 1000 shown in FIG. 10, the video display system comprises a plurality of display screens sized and shaped as aircraft windows. In yet other implementations of the method 1000 shown in FIG. 10, the electronic model of the aircraft comprises (i) one or more models that predict how the aircraft moves in response to control inputs and (ii) one or more models that define an amount of bend of the aircraft when one or more forces or moments are applied to the aircraft.

Figure 11:
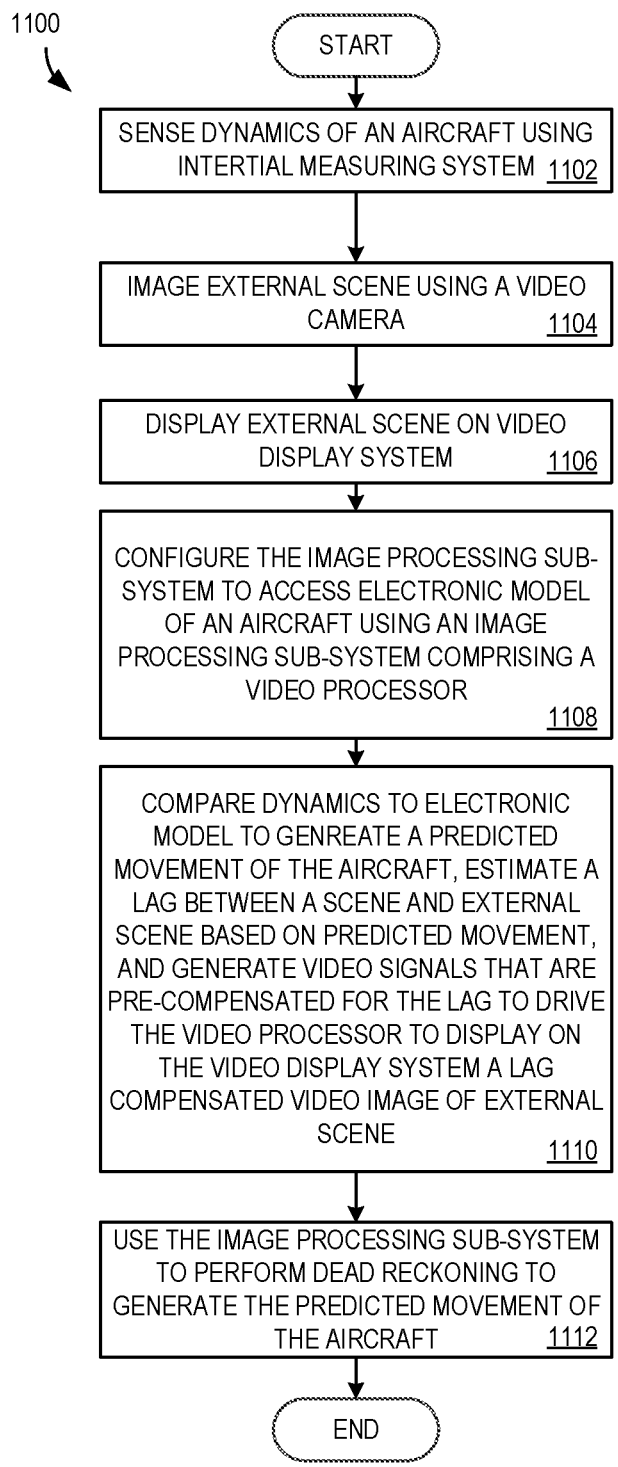
FIG. 11 is a flow chart illustrating a method for video display further comprising performing dead reckoning to adjust video signals in accordance with an implementation.

FIG. 11 is a flow chart illustrating a method for video display 1100 further comprising performing dead reckoning to adjust video signals in accordance with an implementation. In some implementations, the method shown in FIG. 11 is performed by a display system, such as the display system 100 in FIG. 1. Operations 1102, 1104, 1106, 1108 and 1110 are similar to operations 1002, 1004, 1006, 1008 and 1010 of the method 1000 depicted in FIG. 10, and accordingly the description will not be repeated. The image processing sub-system performs dead reckoning to generate the predicted movement of the aircraft at operation 1112. Thereafter, the process is complete. While the operations illustrated in FIG. 11 are performed by a display system, aspects of the disclosure contemplate performance of the operations by other entities. In some implementations, a cloud service performs one or more of the operations.

Figure 12:
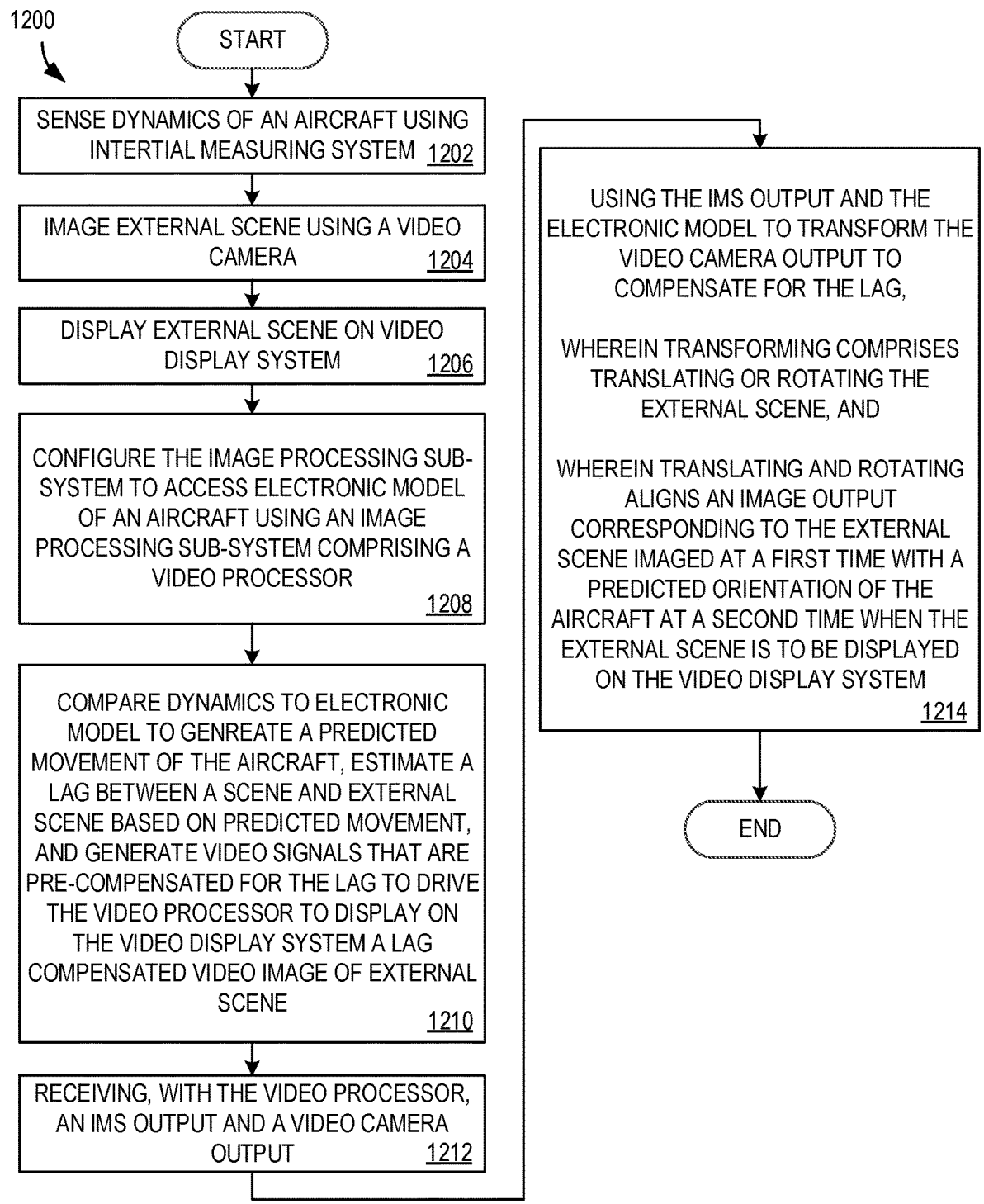
FIG. 12 is a flow chart illustrating a method for video display further comprising using an inertial measuring system (IMS) output and a camera output with an electronic model to transform the camera output to compensate for a lag in accordance with an implementation.

FIG. 12 is a flow chart illustrating a method for video display 1200 further comprising using an output from the inertial measuring system (IMS output) and a camera output with an electronic model to transform the camera output to compensate for a lag in accordance with an implementation. In some implementations, the method shown in FIG. 12 is performed by a display system, such as the display system 100 in FIG. 1. Operations 1202, 1204, 1206, 1208 and 1210 are similar to operations 1002, 1004, 1006, 1008 and 1010 of the method 1000 depicted in FIG. 10, and accordingly the description will not be repeated. The method 1200 receives, with the video processor, an output from the inertial measuring system (IMS output) and a camera output from the video camera at operation 1212. The process uses the IMS output and the electronic model to transform the camera output to compensate for the lag at operation 1214. The transforming comprises at least one of translating or rotating the external scene imaged by the video camera. The translating and rotating aligns an image output corresponding to the external scene imaged by the video camera imaged at a first time with a predicted orientation of the aircraft at a second time when the external scene is to be displayed on the video display system. Thereafter, the process is complete. While the operations illustrated in FIG. 12 are performed by a display system, aspects of the disclosure contemplate performance of the operations by other entities. In some implementations, a cloud service performs one or more of the operations.

Additional Examples

Figure 14:
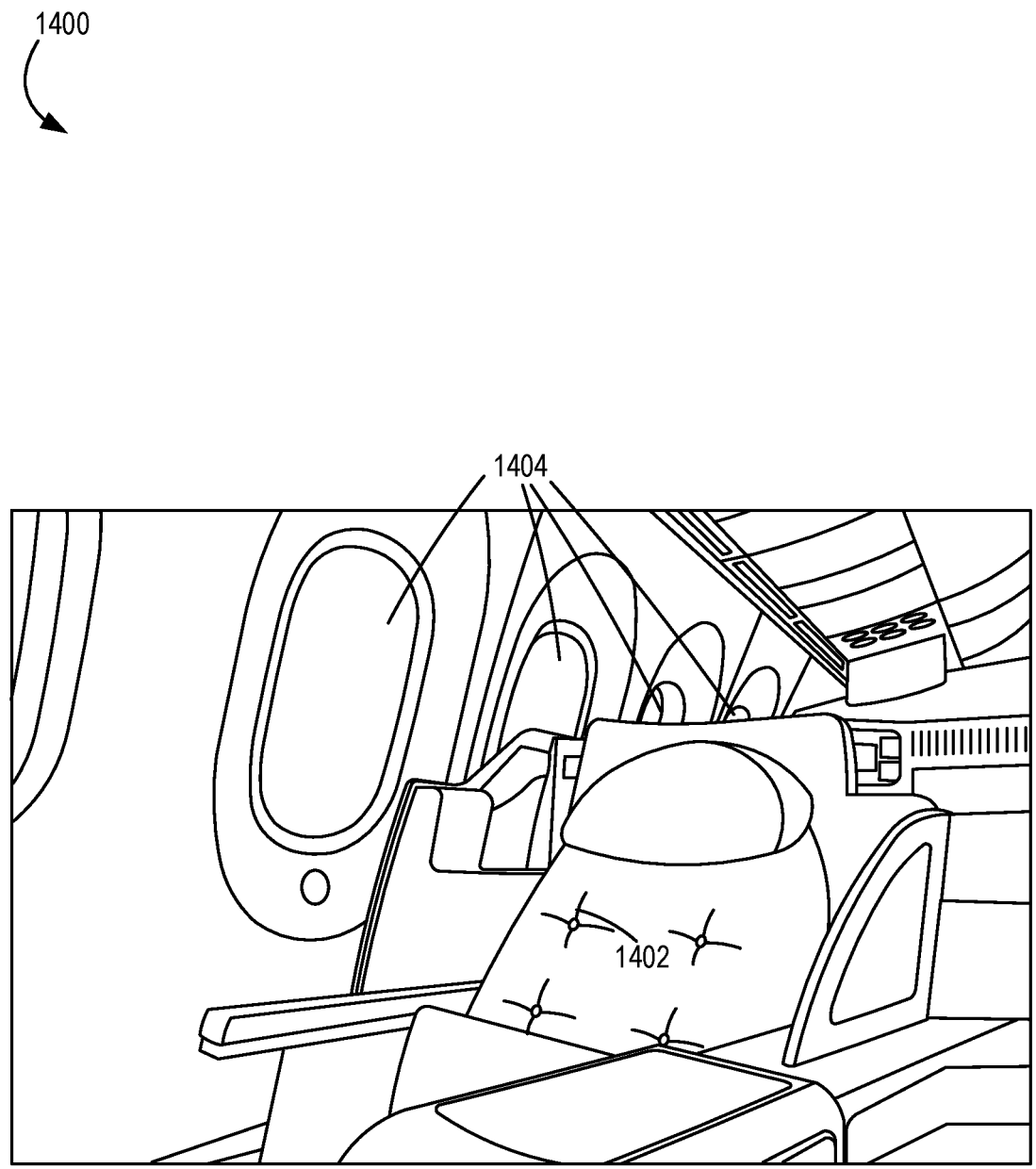
FIG. 14 is an illustrative perspective view of a portion of an aircraft interior in accordance with an implementation.

Some implementations of the disclosed display system herein comprise a video processor (e.g., the video processor 110 of FIG. 1) that has a known latency and that: receives the video output of a camera (e.g., the video camera 104 of FIG. 1); uses sensor data (e.g., dynamics 182 data from the IMS 180 or the at least one sensor 102 in FIG. 1) and a computer model (e.g., the electronic model 120 of FIG. 1) to predict how an orientation of an aircraft interior (e.g., the aircraft interior 1400 of FIG. 14) will change in the time between when the camera acquires each image (e.g., each frame of the video output) and when the image appears on a display (e.g., the video display system 106 of FIG. 1); transforms the video output to match the predicted change in orientation of the aircraft interior; and sends the transformed video output of the camera to the display. In such implementations, the camera initially captures an image of how the world outside the aircraft looks at some time $t_0$ when the aircraft is at a first position and orientation. The sensor data and the model predict position and orientation of the aircraft at a future time $t_1$, where $t_1$ is later than $t_0$ by an amount $t_A$ that is equal to the sum of latencies in the camera, the display, and the video processor.

Any reference to "forces, torques, rotation rates, or moments" herein is intended to refer to any combination of at least one of forces, torques, rotation rates, or moments.

Figure 15:
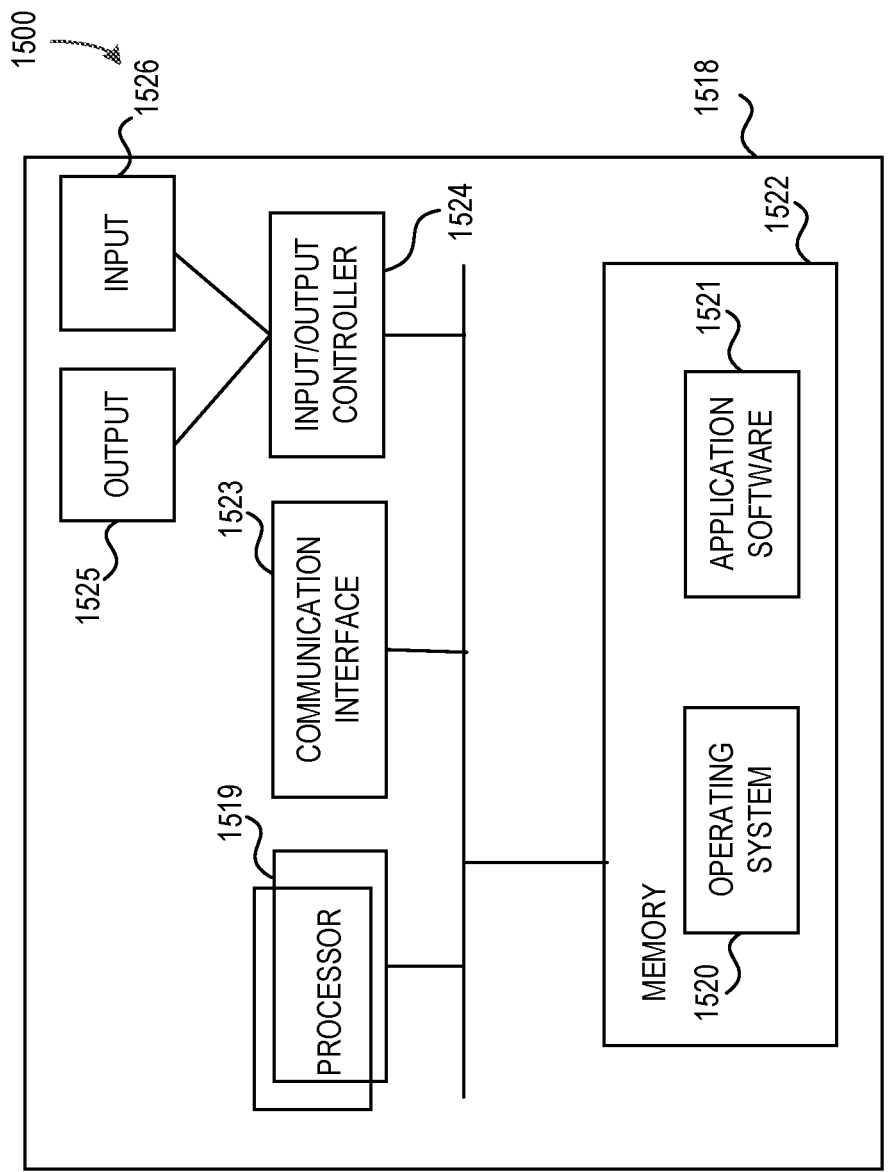
FIG. 15 is a block diagram illustrating an operating environment in accordance with an implementation.

In some implementations, a lag (such as the lag 122 of FIG. 1) is stored on computer readable media to which the system or methods disclosed herein have access. In some such implementations, the operating environment comprises such computer readable media. FIG. 15 and the associated discussion herein implement such an operating environment.

The video processor transforms the image captured by the camera at $t0$ to an image that a passenger would see if she looked out a window at $t_1$. The latencies of the video processor, the video camera, and the display add up so that the transformed image appears on the screen at $t_1$. Thus, the passenger perceives the image as having no lag relative to the motion of the aircraft.

Unless otherwise stated, any implementation described herein as being incorporated into or using a specific type of vehicle (e.g., an aircraft) shall be understood to be installable into and usable with any other type of vehicle (e.g., trains, submersibles, tanks, armored personnel carriers, water-faring vessels, etc.). With regard to military applications specifically, implementations of the disclosure herein are well-suited to vehicle gunnery positions and other such stations, allowing the vehicle operator(s) to work well away from the potentially dangerous exterior of the vehicle, which is likely to be targeted by local hostile forces, without risking motion sickness.

The disclosure is directed to a video display systems and methods that reduce motion sickness and increase accuracy of video in a synthetic vision system used onboard a moving vehicle. Some implementations of such synthetic vision systems include but are not limited to an external video camera mounted proximate the vehicle exterior, with an associated device in the vehicle interior configured to display video from the video camera. Some implementations disclosed herein use a combination of any or all of the kinematics model(s), rigid body model(s), structural dynamics model(s), and or aerodynamics model(s) disclosed herein as appropriate for the intended application.

In some implementations of any of the display systems and methods disclosed herein: (1) any video camera(s) (e.g., the video camera 104 of FIG. 1) are externally-facing and each have a known field of view, a known location, and a known latency; and (2) any display system (e.g., the video display system 106 of FIG. 1) has a known latency. Such display systems and methods are configured to show a smaller field of view than the field of view of the video camera(s). By utilizing a smaller field of view compared to the video camera(s), the display systems are effectively able to examine portions of the external scene not yet visible on the display system but already captured by the video camera (s) and perform transformations accordingly to enable the zero-lag display.

Some implementations substitute a digital scene generator ("DSG") (not shown) in place of video cameras (e.g., the video camera 104 of FIG. 1). The scene generator uses a geographical information system ("GIS") to render images similar to what a video camera produces from a known location on a vehicle equipped with the display system and or employing the methods of this disclosure. Hypersonic aircraft are particularly good candidates for use of implementations incorporating the DSG, given that high temperatures when travelling at hypersonic speeds not only make windows infeasible, but also often makes cameras infeasible or prohibitively expensive as well.

In some implementations, the video display system (e.g., the video display system 106 of FIG. 1) is a two-dimensional display. In other implementations, the video display system is a three-dimensional display configured to provide stereoscopic, binocular vision (e.g., through the use of two cameras each offset for one eye of the passenger). Any type of video camera is usable with the disclosure, including but not limited to two-dimensional cameras, three-dimensional cameras, multiple cameras of any type together or in combination, cameras whose output is stitched together, depth cameras, etc. Ideally, cameras used in implementations of the disclosure herein have fixed framerates, providing easier-to-compensate-for fixed latencies, but implementations of the disclosure are operable also with variable framerates. The closer to a camera a passenger is seated, the more the passenger will feel proximate to the exterior scene. However, in some implementations it is useful to place the camera away from a passenger in order to provide an unobstructed exterior scene view to a passenger whose view would otherwise be obstructed if a window was present (e.g., passengers seated above the wings of an aircraft).

In the context of this disclosure, "no lag," "zero-lag," "lag-free," and functionally equivalent descriptors should be understood to refer both to actual lag-free implementations and also implementations whose lag is negligible to the point that a passenger registers no mismatch between the input of their visual and vestibular systems sufficient to cause airsickness. Whether a particular implementation is actually lag-free or has such negligible lag depends on the available resources and the needs of a particular application. In all implementations of this disclosure, the look-ahead interval of the electronic model of the aircraft used to transform the displayed scene (e.g., the scene 124 or the lag compensated video image 128 of FIG. 1) either equates the sum of latencies or lags through the whole implementation or so nearly equates the sum that the difference is insufficient to cause air-sickness due to a mismatch between passenger vision and vestibular system feedback.

In some implementations, a group of seats (e.g., the 164 in FIG. 1) is comprised of multiple proximate rows of seats. Some such groups of seats are chosen based on the flexibility of the interior and or fuselage of an aircraft (e.g., the aircraft 112 in FIG. 1). If the fuselage of the aircraft is extremely rigid, then any force, torque, or moment (e.g., an aileron deflection) changes the orientation of all the seats the same way at the same time, so one group of seats suffices. If the fuselage of the aircraft is less rigid, then the same force, torque, or moment changes the orientation of some seats before other seats, to a different extent than other seats, in a different direction than other seats, or any combination of the foregoing. In such scenarios, a predicted change in orientation over time $t_{66}$ is sometimes correct for some groups of seats but not for other groups of seats, necessitating dedication of a separate video processor to each group of seats. The video processor associated with each group of seats uses dynamics data and the electronic model (e.g., the electronic model 120 in FIG. 1) to predict the motion of the group of seats, transforms the output of the camera (e.g., the video camera 104) to match the predicted motion, and sends the transformed output of the camera to display(s) (e.g., the video display system 106 of FIG. 1) associated with that group of seats. Some such implementations use smaller groups of seats (or even a single seat) in premium sections of the aircraft interior to give a better match between the displayed image and the exterior scene.

In some implementations herein including an aircraft (e.g., the aircraft 112 of FIG. 1), the IMS (e.g., the IMS 180 of FIG. 1) further comprises, without limitation, accelerometers on the nose, tail, or wing(s), and or encoders that measure positions of flight control surfaces. In some of the implementations disclosed herein, the IMS measures acceleration in six axes (x, y, z, pitch, roll, and yaw). Many modern aircraft contain factory-installed sensors or a factory installed IMS suitable for use with the disclosure herein when paired with a structural dynamics model of the specific aircraft to ensure correct interpretation of the sensor or IMS data.

Dead reckoning is an open-loop navigation method based on determination without the aid of celestial navigation of the position of a ship or aircraft from the record of the courses sailed or flown, the distance travelled (e.g., as estimated from velocity), the known starting point, and the known or estimated drift. Dead reckoning depends on measurement of heading and distance of travel, without any external references (e.g., landmarks) to verify or correct the resulting prediction of the current position. Some implementations of dead reckoning incorporate compass-based navigation techniques (e.g., travel from A to B, where it is known B is a certain number of degrees off of true north). Euler angles are three angles used to describe the orientation of a rigid body with respect to a fixed coordinate system. Euler angles also represent the orientation of a mobile frame of reference in physics or the orientation of a general basis in three-dimensional linear algebra. Herein, Euler angles represent pitch, roll, and yaw. Given a specific reference frame, Euler angles determine how to measure the orientation of an object (or part of an object) relative to the reference frame. In some implementations herein, dead reckoning represents an open-loop method to estimate a change in orientation based on an elapsed time and measured or predicted rates of change in one or more Euler angles.

As used herein, a material or component described using the terms "transparent" or "translucent" means that light is transmissible through the material and emitted from another side of the material. The term "transparent" indicates a greater amount of light transmittance than the term "translucent," such that a transparent material will have less light distortion, diffusion, and/or attenuation than a translucent material. In this disclosure, the use of the term "translucent" to describe a material or component is not intended, unless explicitly stated, to exclude material that is also transparent. In some implementations, a material or component described as "translucent" means that the material or component is at least translucent and also possibly (but not always) transparent.

In the context of this disclosure, when used as a verb, "image" includes but is not limited to making a visual representation of an object by scanning it with a detector or electromagnetic beam. A "video camera," as used herein, includes but is not limited to any image capture device used for electronic motion picture acquisition. An "external scene" as refers to the portion of the real world about which the disclosed systems and methods herein receive information in order to provide a lag-free display.

At least a portion of the functionality of the various elements in the figures are in some implementations performed by other elements in the figures, and or an entity (e.g., a computer) not shown in the figures.

In some implementations, the operations illustrated in FIG. 10, FIG. 11, and FIG. 12 are performed by a single person, a group of persons, a fully- or partially-automated video display system, or any combination of the foregoing. As an illustration, in some implementations the video camera and the IMS are each be provided by distinct suppliers to a wholly separate assembler who couples the video camera and the IMS to an aircraft.

While the aspects of the disclosure have been described in terms of various implementations with their associated operations, a person skilled in the art would appreciate that a combination of operations from any number of different implementations is also within scope of the aspects of the disclosure.

While no personally identifiable information is tracked by aspects of the disclosure, implementations have been described with reference to data monitored and/or collected from the users. In some implementations, notice is provided to the users of the collection of the data (e.g., via a dialog box or preference setting) and users are given the opportunity to give or deny consent for the monitoring and/or collection. The consent sometimes takes the form of opt-in consent or opt-out consent.

Exemplary Operating Environment

The present disclosure is operable in a variety of terrestrial and extra-terrestrial environments for a variety of applications. For illustrative purposes only, and with no intent to limit the possible operating environments in which implementations of the disclosure operate, the following exemplary operating environment is presented. The present disclosure is operable within an aircraft operating environment according to an implementation as an aircraft 1300 in FIG. 13. Implementations of the aircraft 1300 include but are not limited to an airframe 1302 with an at least one video camera 1316 proximate thereto, a plurality of high-level systems 1304, and an interior 1306. In some implementations, the at least one video camera 1316 is the video camera 104 of FIG. 1. Some implementations of the aircraft 1300 incorporate high-level systems 1304 including but not limited to: one or more of a propulsion system 1308, an electrical system 1310, a hydraulic system 1312, and an environmental system 1314. Any number of other systems may be included in implementations of the aircraft 1300. Although an aerospace implementation is shown, the principles are applicable to other industries, such as the automotive and nautical industries.

Figure 13:
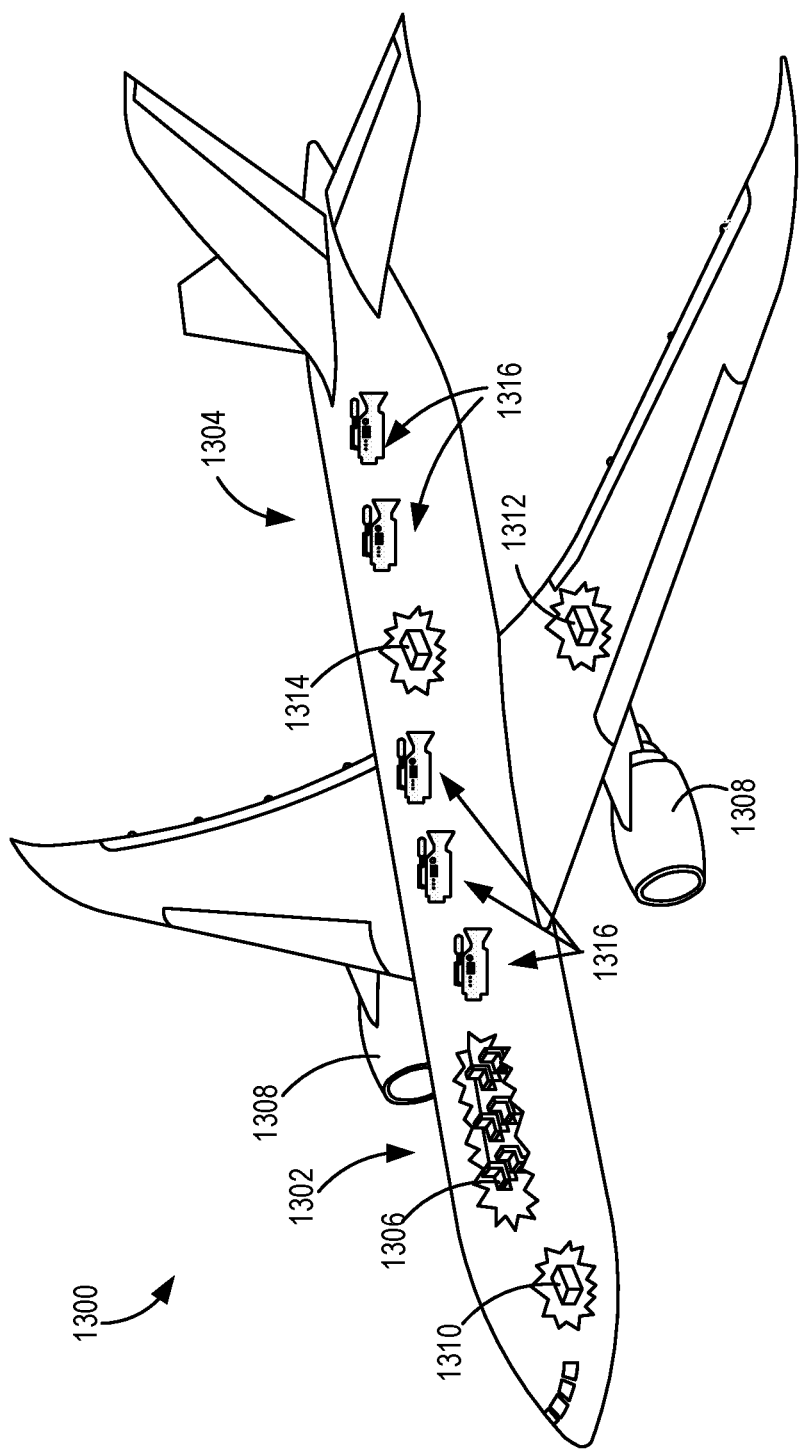
FIG. 13 is a schematic perspective view of an aircraft in accordance with an implementation.

Implementations of the present disclosure further comprise an aircraft interior 1400 of an aircraft (e.g., the aircraft 1300 of FIG. 13). The exact elements and configuration of the aircraft interior 1400 will vary dependent in part on the elements and configuration of the associated aircraft 1300. For illustrative purposes only, and with no intent to limit the possible aircraft interiors 1400 which implementations of the disclosure comprise, the following exemplary aircraft interior 1400 is presented. The present disclosure is operable within an aircraft interior operating environment according to an implementation as the aircraft interior 1400 in FIG. 14. Implementations of the aircraft interior 1400 include but are not limited to an at least one passenger seat 1402 and an associated at least one internal video display 1404. In various implementations of the disclosure, the at least one passenger seat 1402 is configurable as a chair, a bench, or any other device suitable for allowing aircraft passengers to sit safely and securely during the operation of the aircraft. In some implementations, the associated at least one internal video display 1404 is the video display system 106 or the plurality of display screens 116 of FIG. 1. Any number of other elements may be included in implementations of the aircraft interior 1400. Although an implementation is shown, the principles are applicable to other industries, such as the automotive and nautical industries.

The present disclosure is operable with a computing apparatus according to an implementation as a functional block diagram 1500 in FIG. 15. In such an implementation, components of a computing apparatus 1518 may be implemented as a part of an electronic device according to one or more implementations described in this specification. The computing apparatus 1518 comprises one or more processors 1519 which may be microprocessors, controllers or any other suitable type of processors for processing computer executable instructions to control the operation of the electronic device. Platform software comprising an operating system 1520 or any other suitable platform software may be provided on the apparatus 1518 to enable application software 1521 to be executed on the device. According to an implementation, video display as described herein may be accomplished by software.

Computer executable instructions may be provided using any computer-readable media that are accessible by the computing apparatus 1518. Computer-readable media may include, without limitation, computer storage media such as a memory 1522 and communications media. Computer storage media, such as a memory 1522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that is usable to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1522) is shown within the computing apparatus 1518, it will be appreciated by a person skilled in the art, that the storage may be distributed or located remotely and accessed via a network or other communication link (e.g., using a communication interface 1523).

The computing apparatus 1518 may comprise an input/output controller 1524 configured to output information to one or more output devices 1525, in some implementations a display or a speaker, which may be separate from or integral to the electronic device. The input/output controller 1524 may also be configured to receive and process an input from one or more input devices 1526, in some implementations a keyboard, a microphone or a touchpad. In one implementation, the output device 1525 may also act as the input device. An touch sensitive display is one such device. The input/output controller 1524 may also output data to devices other than the output device, e.g., a locally connected printing device. In some implementations, a user may provide input to the input device(s) 1526 and/or receive output from the output device(s) 1525.

The functionality described herein is performable, at least in part, by one or more hardware logic components. According to an implementation, the computing apparatus 1518 is configured by the program code when executed by the processor 1519 to execute the implementations of the operations and functionality described. Alternatively, or in addition, the functionality described herein is performable, at least in part, by one or more hardware logic components. Without limitation, illustrative types of hardware logic components that are usable include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Thus, various implementations include a systems and methods for video display that sense dynamics of an aircraft using an inertial measuring system (IMS); image an external scene using a video camera; display the external scene imaged by the video camera using a video display system inside the aircraft; configure an image processing subsystem comprising a video processor to access an electronic model of the aircraft and compare the dynamics sensed by the IMS to the electronic model to generate a predicted movement of the aircraft, estimate a lag between a scene and the external scene imaged by the video camera based on the predicted movement, and generate video signals that are pre-compensated for the lag to drive the video processor to display on the video display system a lag compensated video image of the external scene.

As described herein, the present disclosure provides systems and methods for lag-free video display. The systems and methods herein efficiently and effectively construct and deploy within a lag-free video display suitable for use in a number of moving vehicles, including but not limited to the above exemplary operating environment.

While various spatial and directional terms, such as top, bottom, lower, mid, lateral, horizontal, vertical, front and the like may be used to describe the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein is extendable or alterable without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as exemplary forms of implementing the claims.

It will be understood that the benefits and advantages described above can relate to one implementation or can relate to several implementations. The implementations are not limited to those that address every issue discussed in the Background herein or those that have any or all of the stated benefits and advantages.

The implementations illustrated and described herein as well as implementations not specifically described herein but within the scope of aspects of the claims constitute exemplary means for video display.

The order of execution or performance of the operations in implementations of the disclosure illustrated and described herein is not essential, unless otherwise specified. That is, the operations may be performed in any order, unless otherwise specified, and examples of the disclosure may include additional or fewer operations than those disclosed herein. As an illustration, it is contemplated that executing or performing a particular operation before, contemporaneously with, or after another operation is within the scope of aspects of the disclosure.

When introducing elements of aspects of the disclosure or the implementations thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Clauses

The following clauses describe further aspects:
Clause Set A:
A1. A display system comprising:
an inertial measuring system (IMS) configured to sense dynamics of an aircraft;
a video camera configured to image an external scene;
a video display system inside the aircraft; and
an image processing sub-system comprising a video processor, the image processing sub-system configured to access an electronic model of the aircraft and compare the dynamics sensed by the IMS to the electronic model to generate a predicted movement of the aircraft, and estimate a lag between a scene and the external scene imaged by the video camera based on the predicted movement, and generate video signals that are pre-compensated for the lag to drive the video processor to display on the video display system a lag compensated video image of the external scene.

A2. The display system of any preceding clause, wherein the image processing sub-system is further configured to perform dead reckoning to generate the predicted movement of the aircraft.

A3. The display system of claim any preceding clause, wherein the lag relates to (i) a lag time between when an image corresponding to the external scene is sensed at the video camera and a video signal is output from the video camera, (ii) a processor lag time of the video processor, and (iii) a lag time between the output of the video signals that are pre-compensated for the lag and the display of the external scene corresponding to the video signals on the video display system.

A4. The display system of any preceding clause, wherein at least one of the video camera the video display system, and the video processor have a known latency; such that any detected variation from the known latency of at least one of the video camera, the video display system, or the video processor indicate at least one of a malfunction of or interference with at least one of the video camera, the video display system, or the video processor.

A5. The display system any preceding clause, wherein the video processor receives an output from the inertial measuring system (IMS output) and a camera output from the video camera, and uses the IMS output and the electronic model to transform the camera output to compensate for the lag;
  wherein the transforming comprises at least one of translating or rotating the external scene imaged by the video camera; and
  wherein the translating and rotating aligns an image output (194) corresponding to the external scene (152) imaged by the video camera (104) imaged at a first time with a predicted orientation (196) of the aircraft (112) at a second time when the external scene (152) is to be displayed on the video display system (106).

A6. The display system of any preceding clause, further comprising a plurality of video processors and a plurality of video display systems, wherein the electronic model comprises responses of groups of seats within the aircraft to the dynamics of the aircraft, and wherein each group of seats is associated with an at least one video processor and an at least one video display system, the at least one video processor and the at least one video display system associated with each group of seats in communication with each other.

A7. The display system of any preceding clause, wherein the video display system comprises a plurality of display screens (116) sized and shaped as aircraft windows.

A8. The display system of any preceding clause, wherein the electronic model of the aircraft comprises (i) one or more models that predict how the aircraft moves in response to control inputs and (ii) one or more models that define an amount of bend of the aircraft when one or more forces or moments are applied to the aircraft.

A9. The display system of any preceding clause, wherein the dynamics comprise an at least one of forces, torques, rotation rates, or moments.

Clause Set B:

B1. A method for video display comprising:
sensing dynamics of an aircraft;
imaging an external scene using a video camera;
displaying the external scene imaged by the video camera using a video display system inside the aircraft;
configuring an image processing sub-system comprising a video processor to access an electronic model of the aircraft;
comparing the dynamics sensed by the IMS to the electronic model to generate a predicted movement of the aircraft;
estimating a lag between a scene and the external scene imaged by the video camera based on the predicted movement; and
generating video signals that are pre-compensated for the lag to drive the video processor to display on the video display system a lag compensated video image of the external scene.

B2. The method of any preceding clause, further comprising using the image processing sub-system to perform dead reckoning to generate the predicted movement of the aircraft.

B3. The method of any preceding clause, wherein the lag relates to (i) a lag time between when an image corresponding to the external scene is sensed at the video camera and a video signal is output from the video camera, (ii) a processor lag time of the video processor, and (iii) a lag time between the output of the video signals that are pre-compensated for the lag and the display of the external scene corresponding to the video signals on the video display system.

B4. The method of any preceding clause, wherein at least one of the video camera, the video display system, and the video processor have a known latency;
  such that any detected variation from the known latency of at least one of the video camera, the video display system, or the video processor indicate at least one of a malfunction of or interference with at least one of the video camera, the video display system, or the video processor.

B5. The method of any preceding clause, further comprising:
  receiving, with the video processor, an output from the inertial measuring system (IMS output) and a camera output from the video camera, and
  using the IMS output and the electronic model to transform the camera output to compensate for the lag;
  wherein the transforming comprises at least one of translating or rotating the external scene imaged by the video camera; and
  wherein the translating and rotating aligns an image output corresponding to the external scene imaged by the video camera imaged at a first time with a predicted orientation of the aircraft at a second time when the external scene is to be displayed on the video display system.

B6. The method of any preceding clause, further comprising:
  imaging the external scene using a plurality of video cameras;
  displaying the external scene imaged by the plurality of video cameras using a plurality of video display systems;
  wherein the electronic model comprises responses of groups of seats within the aircraft to the dynamics of the aircraft, and wherein each group of seats is associated with an at least one video processor and an at least one video display system, the at least one video processor and the at least one video display system associated with each group of seats in communication with each other.

B7. The method of any preceding clause, wherein the video display system comprises a plurality of display screens sized and shaped as aircraft windows.

B8. The method of any preceding clause, wherein the electronic model of the aircraft comprises (i) one or more models that predict how the aircraft moves in response to control inputs and (ii) one or more models that define an amount of bend of the aircraft when one or more forces or moments are applied to the aircraft.

B9. The method of any preceding clause, wherein the dynamics comprise an at least one of forces, torques, rotation rates, or moments.

Clause Set C:

C1. One or more non-transitory computer readable media having computer-executable instructions stored thereon for video display, which, on execution by a computer, cause the computer to perform operations comprising:
  sensing dynamics of an aircraft using an inertial measuring system (IMS);
  imaging an external scene using a video camera;
  displaying the external scene imaged by the video camera using a video display system inside the aircraft;
  configuring an image processing sub-system comprising a video processor to access an electronic model of the aircraft and
    compare the dynamics sensed by the IMS to the electronic model to generate a predicted movement of the aircraft;
    estimate a lag between a scene and the external scene imaged by the video camera based on the predicted movement; and
    generate video signals that are pre-compensated for the lag to drive the video processor to display on the video display system a lag compensated video image of the external scene.

C2. The one or more non-transitory computer readable media of any preceding clause, the computer-executable instructions stored thereon for video display further comprising using the image processing sub-system to perform dead reckoning to generate the predicted movement of the aircraft.

C3. The one or more non-transitory computer readable media of any preceding clause, wherein the lag relates to (i) a lag time between when an image corresponding to the external scene is sensed at the video camera and a video signal is output from the video camera, (ii) a processor lag time of the video processor, and (iii) a lag time between the output of the video signals that are pre-compensated for the lag and the display of the external scene corresponding to the video signals on the video display system.

C4. The one or more non-transitory computer readable media of any preceding clause, wherein at least one of the video camera, the video display system, and the video processor have a known latency;
  such that any detected variation from the known latency of at least one of the video camera, the video display system, or the video processor indicate at least one of a malfunction of or interference with at least one of the video camera, the video display system, or the video processor.

C5. The one or more non-transitory computer readable media of any preceding clause, the computer-executable instructions stored thereon for video display further comprising:
  receiving, with the video processor, an output from the inertial measuring system (IMS output) and a camera output from the video camera, and
  using the IMS output and the electronic model to transform the camera output to compensate for the lag;
  wherein the transforming comprises at least one of translating or rotating the external scene imaged by the video camera; and
  wherein the translating and rotating aligns an image output corresponding to the external scene imaged by the video camera imaged at a first time with a predicted orientation of the aircraft at a second time when the external scene is to be displayed on the video display system.

C6. The one or more non-transitory computer readable media of any preceding clause, the computer-executable instructions stored thereon for video display further comprising:
  imaging the external scene using a plurality of video cameras;
  displaying the external scene imaged by the plurality of video cameras using a plurality of video display systems;
  wherein the electronic model comprises responses of groups of seats within the aircraft to the dynamics of the aircraft, and wherein each group of seats is associated with an at least one video processor and an at least one video display system, the at least one video processor and the at least one video display system associated with each group of seats in communication with each other.

C7. The one or more non-transitory computer readable media of any preceding clause, wherein the video display system comprises a plurality of display screens sized and shaped as aircraft windows.

C8. The one or more non-transitory computer readable media of any preceding clause, wherein the electronic model of the aircraft comprises (i) one or more models that predict how the aircraft moves in response to control inputs and (ii) one or more models that define an amount of bend of the aircraft when one or more forces or moments are applied to the aircraft.

C9. The one or more non-transitory computer readable media of any preceding clause, wherein the dynamics comprise an at least one of forces, torques, rotation rates, or moments.

What is claimed is:

1. A display system comprising:
  an inertial measuring system (IMS) configured to sense dynamics of an aircraft;
  a video camera configured to image an external scene;
  a video display system inside the aircraft; and
  an image processing sub-system comprising a video processor, the image processing sub-system configured to:
    access an electronic model of the aircraft and compare the dynamics sensed by the IMS to the electronic model to compute a response to the sensed dynamics as a function of time,
    predict a movement of the aircraft using the computed response, the predicted movement of the aircraft comprising a prediction of a change in an orientation of an aircraft interior between a first time, when the video camera acquires an image frame imaged by the video camera, and a second time, when the image frame appears on the video display system, estimate a lag between a scene and the external scene imaged by the video camera based on the predicted movement, and generate video signals comprising the image frame that are pre-compensated for the lag to drive the video processor to display on the video display system a lag compensated video image of the external scene, the lag compensated video image of the external scene being:

transformed by the video processor to match the predicted movement of the aircraft from the first time to the second time, and displayed on the video display system at the second time.

2. The display system of claim 1, wherein the image processing sub-system is further configured to perform dead reckoning to generate the predicted movement of the aircraft;

the video camera having a first known field of view (FOV), a first known location, and a first known latency;

the video display system having a second known field of view (FOV) and a second known latency, the second known FOV being smaller than the first known FOV;

the predicting the movement of the aircraft further comprising examining at least one portion of the external scene outside the second known FOV, the at least one portion of the external scene previously captured by the video camera and within the first known FOV; and the transforming by the video processor further comprising using the examined at least one portion of the external scene to refine the transformation.

3. The display system of claim 1, wherein the lag relates to (i) a lag time between when an image corresponding to the external scene is sensed at the video camera and a video signal is output from the video camera, (ii) a processor lag time of the video processor, and (iii) a lag time between the output of the video signals that are pre-compensated for the lag and the display of the external scene corresponding to the video signals on the video display system.

4. The display system of claim 3, wherein at least one of the video camera, the video display system, and the video processor have a known latency;

such that any detected variation from the known latency of at least one of the video camera, the video display system, or the video processor indicate at least one of a malfunction of or interference with at least one of the video camera, the video display system, or the video processor.

5. The display system of claim 1, wherein the video processor receives an output from the IMS and a camera output from the video camera, and uses the IMS output and the electronic model to transform the camera output to compensate for the lag;

wherein the transforming comprises at least one of translating or rotating the external scene imaged by the video camera; and wherein the translating and rotating aligns an image output corresponding to the external scene imaged by the video camera imaged at the first time with a predicted orientation of the aircraft at the second time when the external scene is to be displayed on the video display system.

6. The display system of claim 1, further comprising a plurality of video processors and a plurality of video display systems, wherein the electronic model comprises responses of groups of seats within the aircraft to the dynamics of the aircraft, and wherein each group of seats is associated with an at least one video processor and an at least one video display system, the at least one video processor and the at least one video display system associated with each group of seats in communication with each other.

7. The display system of claim 1, wherein the video display system comprises a plurality of display screens sized and shaped as aircraft windows.

8. The display system of claim 1, wherein the electronic model of the aircraft comprises:

(i) one or more models that predict how the aircraft moves in response to control inputs and (ii) one or more models that define an amount of bend of the aircraft when one or more forces or moments are applied to the aircraft.

9. The display system of claim 1, wherein the dynamics comprise an at least one of forces, torques, rotation rates, or moments.

10. A method for video display comprising:

sensing dynamics of an aircraft using an inertial measuring system (IMS);

imaging an external scene using a video camera;

displaying the external scene imaged by the video camera using a video display system inside the aircraft;

configuring an image processing sub-system comprising a video processor to processor to access an electronic model of the aircraft;

comparing the dynamics sensed by the IMS to the electronic model to compute a response to the sensed dynamics as a function of time;

predicting a movement of the aircraft using the computed response, the predicted movement of the aircraft comprising a prediction of a change in an orientation of an aircraft interior between a first time, when the video camera acquires an image frame imaged by the video camera, and a second time, when the image frame appears on the video display system;

estimating a lag between a scene and the external scene imaged by the video camera based on the predicted movement; and generating video signals comprising the image frame that are pre-compensated for the lag to drive the video processor to display on the video display system a lag compensated video image of the external scene, the lag compensated video image of the external scene being:

transformed by the video processor to match the predicted movement of the aircraft from the first time to the second time, and displayed on the video display system at the second time.

11. The method of claim 10, further comprising using the image processing sub-system to perform dead reckoning to generate the predicted movement of the aircraft, and the imaging the external scene further comprising:

capturing with the video camera an image of how an environment outside the aircraft looks at a time to wherein at the time to the aircraft is in a first position and a first orientation; and sensor data and the electronic model predict a second position and a second orientation of the aircraft at a future time $t_1$, where $t_1$ is later than to by an amount $t_A$, $t_A$ being equal to a sum of latencies in the camera, the display, and the video processor.

12. The method of claim 10, wherein the lag relates to (i) a lag time between when an image corresponding to the external scene is sensed at the video camera and a video signal is output from the video camera, (ii) a processor lag time of the video processor, and (iii) a lag time between the output of the video signals that are pre-compensated for the lag and the display of the external scene corresponding to the video signals on the video display system.

13. The method of claim 12, wherein at least one of the video camera, the video display system, and the video processor have a known latency;
such that any detected variation from the known latency of at least one of the video camera, the video display system, or the video processor indicate at least one of a malfunction of or interference with at least one of the video camera, the video display system, or the video processor.

14. The method of claim 10, further comprising:
receiving, with the video processor, an output from the IMS and a camera output from the video camera, and
using the IMS output and the electronic model to transform the camera output to compensate for the lag;
wherein the transforming comprises at least one of translating or rotating the external scene imaged by the video camera; and
wherein the translating and rotating aligns an image output corresponding to the external scene imaged by the video camera imaged at the first time with a predicted orientation of the aircraft at the second time when the external scene is to be displayed on the video display system.

15. The method of claim 10, further comprising:
imaging the external scene using a plurality of video cameras;
displaying the external scene imaged by the plurality of video cameras using a plurality of video display systems;
wherein the electronic model comprises responses of groups of seats within the aircraft to the dynamics of the aircraft, and wherein each group of seats is associated with an at least one video processor and an at least one video display system, the at least one video processor and the at least one video display system associated with each group of seats in communication with each other.

16. The method of claim 10, wherein the video display system comprises a plurality of display screens sized and shaped as aircraft windows.

17. The method of claim 10, wherein the electronic model of the aircraft comprises (i) one or more models that predict how the aircraft moves in response to control inputs and (ii) one or more models that define an amount of bend of the aircraft when one or more forces or moments are applied to the aircraft.

18. The method of claim 10, wherein the dynamics comprise an at least one of forces, torques, rotation rates, or moments.

19. One or more non-transitory computer readable media having computer-executable instructions stored thereon for video display, which, on execution by a computer, cause the computer to perform operations comprising:
sensing dynamics of an aircraft using an inertial measuring system (IMS);
imaging an external scene using a video camera;
displaying the external scene imaged by the video camera using a video display system inside the aircraft;
configuring an image processing sub-system comprising a video processor to processor to access an electronic model of the aircraft and:
compare the dynamics sensed by the IMS to the electronic model to compute a response to the sensed dynamics as a function of time;
predict a movement of the aircraft using the computed response, the predicted movement of the aircraft comprising a prediction of a change in an orientation of an aircraft interior between a first time, when the video camera acquires an image frame imaged by the video camera, and a second time, when the image frame appears on the video display system;
estimate a lag between a scene and the external scene imaged by the video camera based on the predicted movement; and
generate video signals comprising the image frame that are pre-compensated for the lag to drive the video processor to display on the video display system a lag compensated video image of the external scene, the lag compensated video image of the external scene being:
transformed by the video processor to match the predicted movement of the aircraft from the first time to the second time, and
displayed on the video display system at the second time.

20. The one or more non-transitory computer readable media of claim 19, the computer-executable instructions stored thereon for video display further comprising using the image processing sub-system to perform dead reckoning to generate the predicted movement of the aircraft.

21. The one or more non-transitory computer readable media of claim 19, wherein the lag relates to (i) a lag time between when an image corresponding to the external scene is sensed at the video camera and a video signal is output from the video camera, (ii) a processor lag time of the video processor, and (iii) a lag time between the output of the video signals that are pre-compensated for the lag and the display of the external scene corresponding to the video signals on the video display system.

22. The one or more non-transitory computer readable media of claim 21, wherein at least one of the video camera, the video display system, and the video processor have a known latency;
such that any detected variation from the known latency of at least one of the video camera, the video display system, or the video processor indicate at least one of a malfunction of or interference with at least one of the video camera, the video display system, or the video processor.

23. The one or more non-transitory computer readable media of claim 19, the computer-executable instructions stored thereon for video display further comprising:
receiving, with the video processor, an output from the IMS and a camera output from the video camera, and
using the IMS output and the electronic model to transform the camera output to compensate for the lag;
wherein the transforming comprises at least one of translating or rotating the external scene imaged by the video camera; and
wherein the translating and rotating aligns an image output corresponding to the external scene imaged by the video camera imaged at the first time with a predicted orientation of the aircraft at the second time when the external scene is to be displayed on the video display system.

24. The one or more non-transitory computer readable media of claim 19, the computer-executable instructions stored thereon for video display further comprising:
  imaging the external scene using a plurality of video cameras;
  displaying the external scene imaged by the plurality of video cameras using a plurality of video display systems;
  wherein the electronic model comprises responses of groups of seats within the aircraft to the dynamics of the aircraft, and wherein each group of seats is associated with an at least one video processor and an at least one video display system, the at least one video processor and the at least one video display system associated with each group of seats in communication with each other.

25. The one or more non-transitory computer readable media of claim 19, wherein the video display system comprises a plurality of display screens sized and shaped as aircraft windows.

26. The one or more non-transitory computer readable media of claim 19, wherein the electronic model of the aircraft comprises (i) one or more models that predict how the aircraft moves in response to control inputs and (ii) one or more models that define an amount of bend of the aircraft when one or more forces or moments are applied to the aircraft.

27. The one or more non-transitory computer readable media of claim 19, wherein the electronic model of the aircraft comprises (i) one or more models that predict how the aircraft moves in response to control inputs and (ii) one or more models that define an amount of bend of the aircraft when one or more forces or moments are applied to the aircraft.

28. A display system comprising:
  an inertial measuring system (IMS) configured to sense dynamics of an aircraft;
  a video camera configured to image an external scene;
  a video display system inside the aircraft; and
  an image processing sub-system comprising a video processor, the image processing sub-system configured to:
    access an electronic model of the aircraft and compare the dynamics sensed by the IMS to the electronic model,
    predict a movement of the aircraft to estimate a lag between a scene and the external scene imaged by the video camera based on the predicted movement, and
    generate video signals comprising the image frame that are pre-compensated for the lag to drive the video processor to display on the video display system a lag compensated video image of the external scene, the lag compensated video image of the external scene being:
      transformed by the video processor to match the predicted movement of the aircraft from the first time to the second time, and
      displayed on the video display system at the second time.

29. The display system of claim 28, wherein the image processing sub-system is further configured to:
  access the electronic model of the aircraft and compare the dynamics sensed by the IMS to the electronic model to compute a response to the sensed dynamics as a function of time, and
  predict the movement of the aircraft using the computed response, the predicted movement of the aircraft comprising a prediction of a change in an orientation of an aircraft interior between a first time, when the video camera acquires an image frame imaged by the video camera, and a second time, when the image frame appears on the video display system.

30. The display system of claim 28, the transforming by the video processor further comprising adding movement to the lag compensated video image of the external scene.

31. The display system of claim 28, the transforming by the video processor further comprising increasing movement in the lag compensated video image of the external scene.

* * * * *